Jan. 10, 1928.
R. G. SANDS
1,656,076
LIGHTNING ARRESTER
Filed April 16, 1926
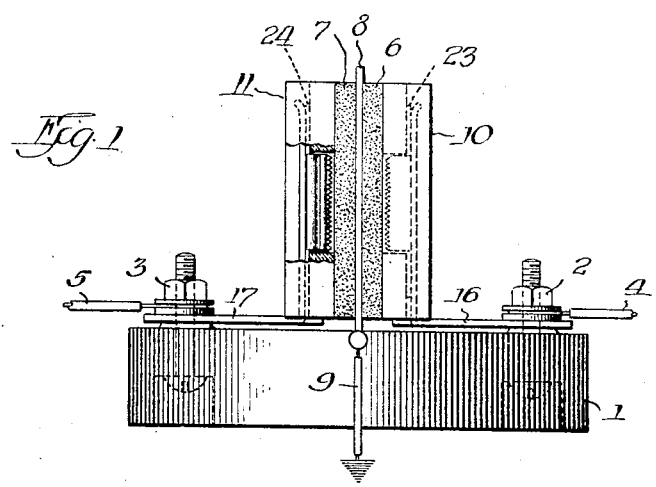
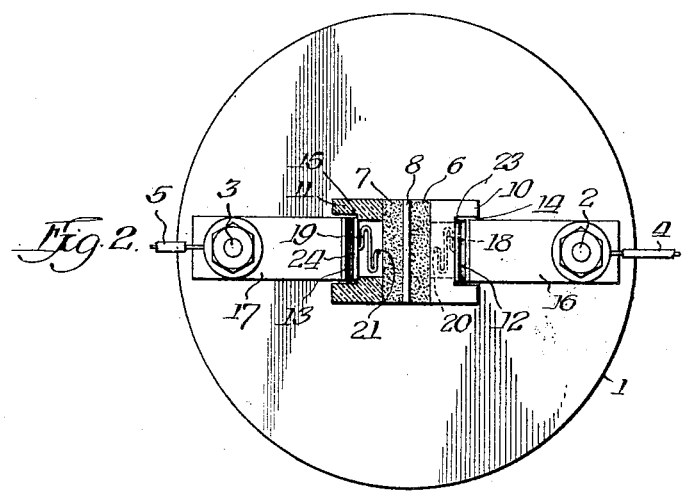
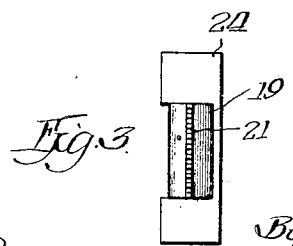
Inventor
Roy G. Sands Patented Jan. 10, 1928.

1,656,076

UNITED STATES PATENT OFFICE.

ROY G. SANDS, OF WAUKEGAN, ILLINOIS.

LIGHTNING ARRESTER.

Application filed April 16, 1926. Serial No. 102,534.

My invention relates to lightning arresters, and particularly to such as are used on telephone circuits.

One of the objects of the invention is to provide a simple, practical and efficient form of lightning arrester.

Another object of the invention is to arrange for the automatic closing of the circuit when lightning or other high potential intrudes upon the circuit, and also to arrange for automatically opening the circuit when the lightning or high potential leaves the circuit.

Another object of the invention is to provide a construction of device having the above advantages which may be used in lightning arresters at present on the market and in actual commercial service, by merely substituting certain new parts for certain parts already embodied in the construction of such arresters, thereby securing the advantages of my invention without requiring an entirely new lightning arrester.

In the accompanying drawings Fig. 1 is a side elevation of a lightning arrester embodying my invention;

Fig. 2 is a plan of the same; and

Fig. 3 is a view of a detail of construction.

Referring to the drawings, I show a lightning arrester having a base 1 provided with two line terminals 2 and 3, to which line wires 4 and 5 are respectively connected.

The lightning arrester proper comprises preferably two carbon or graphite electrodes 6 and 7, and an intermediate metallic plate 8, which is connected with the ground as by a conductor 9.

On the opposite sides of the electrodes 6 and 7 are blocks 10 and 11 made of insulating material, preferably porcelain. Line springs 12 and 13 are arranged on the outer sides of the blocks 10 and 11, the latter being preferably provided with grooves or channels such as 14 and 15, in which the line springs may fit, the line springs being connected with the binding posts 2 and 3, by suitable connecting strips 16 and 17 preferably made integral with the line springs 12 and 13.

Each of the blocks 10 and 11 is provided with circuit controlling devices 18 and 19, which are preferably located in recesses in said blocks. Each of the devices 18 and 19 is adapted normally to maintain an air gap in the ground connection, and also adapted to operate to close said air gap on the passage or prevalence of an arc formed by lightning or other high potential in the circuit, and also to operate to restore the arc gap when the lightning or other high potential leaves the circuit. To such end each of the devices 18 and 19 is preferably made of a zig zag or doubled back shape or form, as shown in Fig. 2, and is preferably composed of two different metals having different coefficients of heat expansion whereby in normal condition said device will be in the shape shown in Fig. 2, but upon becoming heated as by the passage of an arc across the air gap, the shape will be changed and the device will be straightened out to some extent, as a result of which the edge 20 of device 18 will be brought into contact with electrode 6, or the edge 21 of device 19 will be brought into contact with electrode 7, thereby closing the ground circuit or connection. The edges 20 and 21 are preferably serrated or toothed so as to provide a plurality of sparking points as between said edge and the corresponding electrode, as shown in Fig. 1. Each of the devices 18 and 19 is preferably so mounted in its insulating block 10 and 11, that it makes contact with its corresponding line spring 12 and 13, said devices 18 and 19 being to such extent preferably provided with back strips or members 23 and 24, respectively, extending along the line springs 18 and 19, a certain distance, and making contact therewith.

The insulating blocks 10 and 11 carrying the circuit controlling members 18 and 19 are preferably removable bodily from their normal positions, as for example, by pulling them upwardly, referring to Fig. 1, whereby they will slide out between line springs 18 and 19, and the central graphite electrodes 6 and 7. By this removability the device may be easily assembled and replaced from time to time, as desired, and furthermore, the invention may be embodied in lightning arresters already put into service by substituting for certain blocks thereby contained, insulating blocks such as 10 and 11 containing the heat controlling units or devices 18 and 19, and these substituted blocks will transform the old type lightning arresters of similar construction into lightning arresters embodying my invention and capable of automatically closing and opening the ground connection, according as lightning or other high potential intrudes thereon or escapes therefrom, and as previously described.

It will be understood that changes and modifications may be made without departing from the spirit of the invention.

What I claim is:

1. A lightning arrester having a ground electrode, a resilient line terminal, and a removable intermediary member, said member comprising a bent element normally preventing connection between said electrodes and adapted to make such connection on passage of an arc and return to normal on the cessation of said arc.

2. A lightning arrester having a removable insulating block containing a circuit controlling device adapted to close a ground connection upon the intrusion of lightning or high potential on the circuit, and to open a ground connection upon the discontinuance of lightning or other high potential.

3. A lightning arrester having a ground electrode and also having an insulating block containing a circuit controlling device adapted to make contact with said ground electrode upon the intrusion of lightning or high potential on the circuit, and to open said ground contact upon the discontinuance of lightning or other high potential, and a line spring cooperating with said insulating block and making contact with said circuit controlling device.

4. A lightning arrester having a removable insulating block containing a circuit controlling device adapted to close a ground connection upon the intrusion of lightning or high potential on the circuit, and to open a ground connection upon the discontinuance of lightning or other high potential, and a line spring cooperating with said insulating block and making contact with said circuit controlling device.

5. A lightning arrester having a ground electrode and an insulating block adjacent said electrode and a line spring adjacent said insulating block, said block having a recess containing a heat responsive device adapted to contact with the line spring and to maintain an air gap with the electrode, and also adapted to operate to close said air gap and make contact with the electrode on the passage of an arc across the air gap.

6. A lightning arrester having a ground electrode and an insulating block adjacent said electrode and a line spring adjacent said insulating block, said block having a recess containing a heat responsive device adapted to contact with the line spring and to maintain an air gap with the electrode, and also adapted to operate to close said air gap and make contact with the electrode on the passage of an arc across the air gap, and also adapted to operate to produce an air gap on the discontinuance of said arc.

7. A lightning arrester having a ground electrode and a line spring, and an insulating block interposed between said electrode and line spring, said insulating block being adapted for bodily insertion and removal between the same, and a circuit controlling device carried by the insulating block and adapted to make contact with the line spring, and normally form an air gap between itself and the electrode, and also adapted to operate on the passage of an arc so as to close said air gap and also to open the same on the discontinuance of the arc.

8. A lightning arrester having a ground electrode, a flexible line electrode and a detachable member for making and breaking contact between said electrodes on the passage of a heating current, said member comprising a contracted metallic element having a serrated contact edge and adapted to expand and make contact on the passage of an arc and to contract and break contact on the stopping of said arc.

9. An insulating block for lightning arresters having a recess containing a heat responsive device made of zigzag or doubleback shape which tends to straighten on being heated, and one edge of which is adapted to form an air gap while the other edge is adapted to make connection with the line spring.

10. An insulating block for lightning arresters made of substantially rectangular elongated form and provided with a recess containing a bent metal strip adapted to expand and contract in a direction crosswise of the length of the block.

11. An insulating block for lightning arresters made of substantially rectangular elongated form and provided with a recess containing a bent metal strip adapted to expand and contract in a direction crosswise of the length of the block, said block being also provided with a contact strip making connection with one side of said thermal unit.

In witness whereof, I hereunto subscribe my name this eighth day of March, A. D. 1926.

ROY G. SANDS.